US006993174B2

(12) United States Patent
Fan et al.

(10) Patent No.: US 6,993,174 B2
(45) Date of Patent: Jan. 31, 2006

(54) REAL TIME INTERACTIVE SEGMENTATION OF PULMONARY NODULES WITH CONTROL PARAMETERS

(75) Inventors: Li Fan, Plainsboro, NJ (US); Benjamin Odry, Princeton, NJ (US); Jianzhong Qian, Princeton Junction, NJ (US)

(73) Assignee: Siemens Corporate Research, Inc, Princeton, NJ (US)

( * ) Notice: Subject to any disclaimer, the term of this patent is extended or adjusted under 35 U.S.C. 154(b) by 583 days.

(21) Appl. No.: 09/947,629

(22) Filed: Sep. 7, 2001

(65) Prior Publication Data

US 2003/0048936 A1   Mar. 13, 2003

(51) Int. Cl.
*G06K 9/00* (2006.01)
(52) U.S. Cl. .................. 382/131; 382/173; 382/256
(58) Field of Classification Search ............... 382/131, 382/128, 133, 164, 165, 168, 170–173, 180, 382/181, 190, 195, 199, 217, 224, 225, 227, 382/256, 270–273, 288, 307, 308; 128/920, 128/922–925
See application file for complete search history.

(56) References Cited

U.S. PATENT DOCUMENTS

| | | | |
|---|---|---|---|
| 5,016,173 A * | 5/1991 | Kenet et al. | 382/128 |
| 5,881,124 A * | 3/1999 | Giger et al. | 378/8 |
| 6,556,696 B1 * | 4/2003 | Summers et al. | 382/128 |

* cited by examiner

*Primary Examiner*—Brian Werner
*Assistant Examiner*—Christopher Lavin
(74) *Attorney, Agent, or Firm*—Donald B. Paschburg; F. Chau & Associates, LLC

(57) ABSTRACT

Segmentation of pulmonary nodules from digital volumetric image includes segmenting, automatically, the pulmonary nodule from attached anatomical structures by analyzing a structure of interest, and providing a template according to an analyzed structure of interest, wherein the template displays a segmentation of a volume of interest including an object of interest. The template can be adjusted according to a one or more adjustable parameters. The method stores values of the parameters according to the object of interest, and stores a segmentation of the object of interest according to the values of the parameters. The segmentation is refined by extracting and labeling surrounding anatomical structures, defining each structure touching a boundary of a volume of interest as an elongated object, determining a size and shape for each structure, and determining a distance of a current structure to the segmentation result, upon determining the distance to be small compared to a threshold.

10 Claims, 5 Drawing Sheets

REAL TIME INTERACTIVE SEGMENTATION OF PULMONARY NODULES WITH CONTROL PARAMETERS

BACKGROUND OF THE INVENTION

1. Field of the Invention

The present invention relates to computer-assisted diagnosis (CADx) and, in particular, to an interactive computer-aided diagnosis (ICAD) method and system for assisting diagnosis of lung nodules in digital volumetric medical images.

2. Discussion of Prior Art

In Computed Tomography (CT) lung cancer screening and diagnosis, pulmonary nodule segmentation is needed for analysis, such as quantification, classification, and three-dimensional (3D) rendering, and therefore needed to be accurate. However, due to the complex connectivity of pulmonary nodules with surrounding anatomical structures, fully automatic segmentation methods cannot always provide desirable segmentation results. For example, when a pulmonary nodule is attached to a patient's chest wall or vessels, a segmentation results generated by fully automatic method may produce undesirable results.

According to existing proposals, segmentation correction can be implemented by manually drawing polygons on 2D slices to indicate the segmentation results. Another proposed approach, 3D editing, provides tools for manually cutting and pasting arbitrarily on the target object in 3D.

Manually drawing polygons on 2D slices has several drawbacks. In many of the cases, there is no ground truth of nodule segmentation, and therefore manual correction does not necessarily provide better results. In addition, it can be hard to edit 3D data on 2D slices. Further, manual correction can be difficult to reproduce, and therefore, can result in inconsistencies in follow-up studies. Consistency is an important characteristic for nodule segmentation in the sequential CT lung studies since the growth rate or the size change of a nodule is one of the most important measurements for the lung cancer diagnosis.

The 3D editing approach also has a problem of inconsistency. Since the nodule in most cases is in the size of millimeters, even a small handshaking would make the reproducibility too low to be accepted clinically.

Therefore, a need exists for a method of interactive segmentation that can extract nodules in desirable and substantially instantaneously manner is needed.

SUMMARY OF THE INVENTION

According to an embodiment of the present invention, a method is provided for real time segmentation of a pulmonary nodule from a digital volumetric image. The method includes segmenting, automatically, the pulmonary nodule from an attached anatomical structure by analyzing an object of interest, and providing one or more adjustable parameters for adjusting a template, wherein the template shows a segmentation of a volume of interest including the object of interest.

The method stores a value of the parameter according to the object of interest, stores a segmentation of the object of interest according to the value of the parameter, and compares a stored segmentation to a second segmentation of the object of interest according to the value of the parameter.

The method further comprises extracting the object of interest using an intensity threshold and three-dimensional connectivity information. The method includes selecting the intensity threshold for segmentation according to a local histogram analysis of the digital volumetric image.

The method determines a core of the object of interest. The core is determined according to morphological operations. The method includes determining, recursively, a cross correlation to the structure of interest at a plurality of growth steps.

The method further includes determining a cross correlation for the object of interest, and determining a cutoff value. The template is suggested according to the cutoff value.

The method determines an orientation of the object of interest according to an eigenvlues and an eignenvector.

The method further comprises refining the segmentation.

The method adjusts, interactively, the parameter in real time.

According to an embodiment of the present invention, a method is provided for refining a segmentation. The method includes extracting a plurality of surrounding anatomical structures around a segmentation result, and labeling the surrounding structures. The method defines each surrounding structure touching a boundary of a volume of interest as an elongated object, and determines a size and a shape characteristic for each surrounding structure. The method includes determining a distance of a current surrounding structure to the segmentation result, upon determining the distance to be small, as compared to a predefined threshold.

The method further includes determining whether all labeled structures have been evaluated.

According to an embodiment of the present invention, a method is provided for real time segmentation of a pulmonary nodule from a digital volumetric image. The method includes segmenting, automatically, the pulmonary nodule from an attached anatomical structure by analyzing a structure of interest, and providing a template according to an analyzed structure of interest, wherein the template displays a segmentation of a volume of interest including an object of interest. The template can be adjusted according to one or more adjustable parameters. The method stores values of the parameters according to the object of interest, and stores a segmentation of the object of interest according to the values of the parameters.

The method compares a stored segmentation to a second segmentation of the object of interest according to the value of the parameter.

The method further comprises extracting the object of interest using an intensity threshold and three-dimensional connectivity information. The method selects the intensity threshold for segmentation according to a local histogram analysis of the digital volumetric image.

The method includes adjusting, interactively, the parameters in real time.

The method includes refining a segmentation. The method includes extracting a plurality of surrounding anatomical structures around a segmentation result, and labeling the surrounding structures. The method further includes defining each surrounding structure touching a boundary of a volume of interest as an elongated object, and determining a size and a shape characteristic for each surrounding structure. The method includes determining a distance of a current surrounding structure to the segmentation result, upon determining the distance to be small, as compared to a predefined threshold, and determining whether all labeled structures have been evaluated.

BRIEF DISCRIPTION OF THE DRAWINGS

Preferred embodiments of the present invention will be described below in more detail, with reference to the accompanying drawings.

DETAILED DESCRIPTION OF PREFERRED EMBODIMENTS

Figure 1:
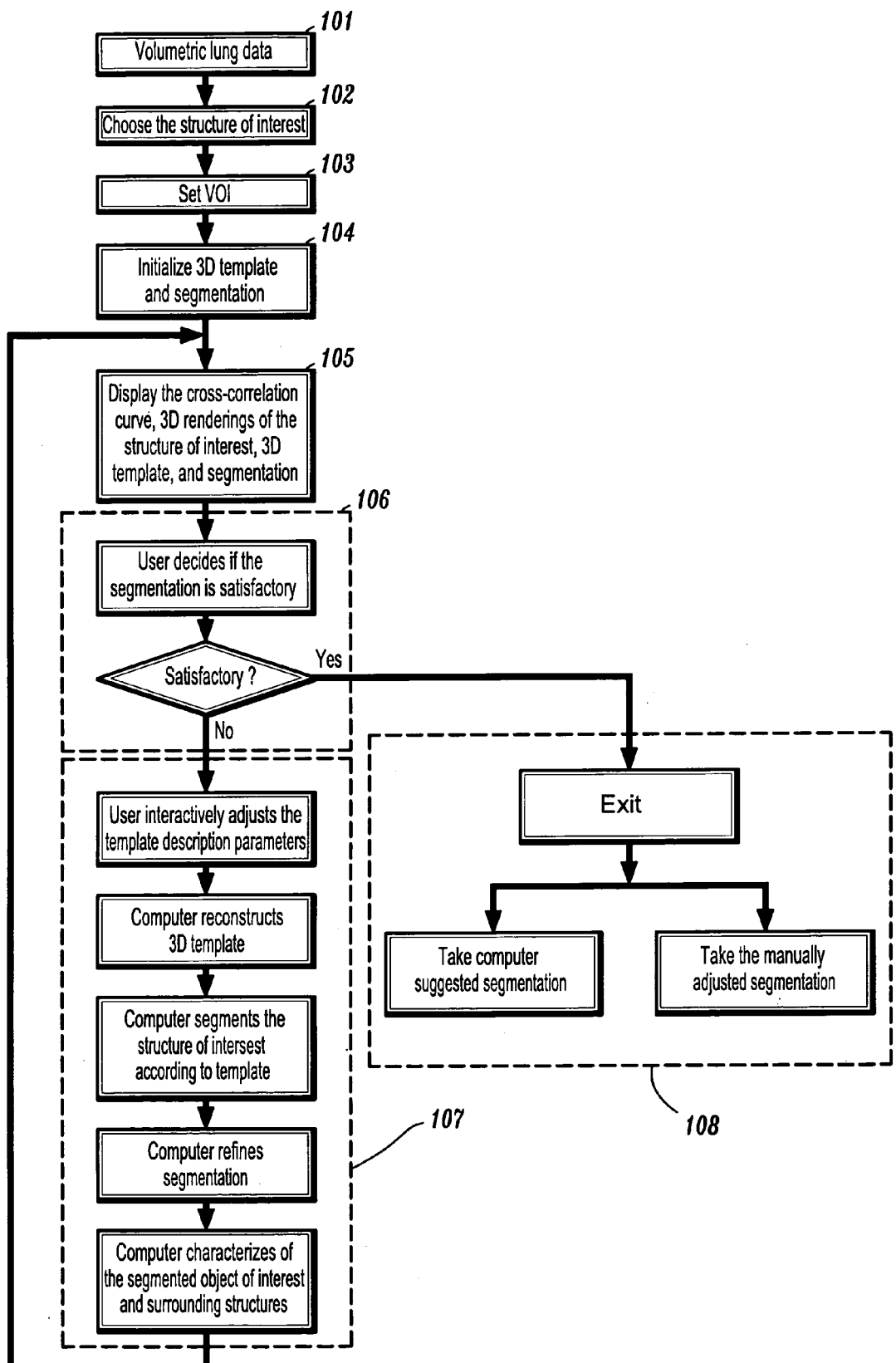
FIG. 1 is a flow chart of a method for real time interactive segmentation, according to an embodiment of the present invention.

The present invention provides a method for interactively segmenting pulmonary nodules from digital volumetric medical images in real time. The present invention is designed to provide users with an interactive segmentation approach so that the segmentation of pulmonary nodules can be automatically implemented, and interactively adjusted and corrected with a desirable degree of consistency with simple control parameters.

It is to be understood that the present invention may be implemented in various forms of hardware, software, firmware, special purpose processors, or a combination thereof. Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof) that is executed via the operating system. In addition, various other peripheral devices may be connected to the computer platform such as an additional data storage device and a printing device.

It is to be further understood that, because some of the constituent system components and method steps depicted in the accompanying Figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

When a nodule is attached to vessels or the chest wall, fully automatic segmentation methods may not yield satisfactory results. The present invention provides user adjustable simple control parameters, thus, desirable segmentation results can then be generated. According to an embodiment of the present invention, the segmentation results generated are consistent and reproducible over time and across different studies. The manually adjusted parameters can be recorded and retrieved for study and/or reuse. This characteristic is important in follow-up studies where sizes of nodules are measured and compared to compute growth rates. Further, the present invention can automatically choose a segmentation threshold based on local histogram analysis. Consequently, the process is substantially instantaneous. Methods for local histogram analysis are discussed in commonly assigned patent Attorney Docket Number 00P7879US, entitled "Method and System for Automatically Detecting Lung Nodules from Multi-Slice High Resolution Computed Tomography (MSHR CT) Images", incorporated herein by reference in its entirety. The method estimates a likelihood that an anatomical structure of interest corresponds to nodule structure or an area warranting further investigation, in real-time, based on predefined criteria and the quantitative measurements. The method presents an automatically adjusted template according to a set of parameters, including for example, a single parameter, three synchronized parameters, or three asynchronous parameters. The method suggests a set of parameter settings according to an automatic analysis of the digital volumetric images. Segmentation results are generated substantially instantaneously. The segmentation results can be rendered in 3D when a user controls scroll bars (discussed below) around the suggested values. Segmentation parameters can be determined according to the 3D rendering.

As depicted in FIG. 1, a user can select a structure of interest 102 after the CT image data is loaded 101, for example, the user can select the structure of interest by pointing a cursor to it. A volume of interest (VOI) is set up 103 for interactive nodule detection. The shape and size of the VOI are defined according to the chest data. The method initializes a 3D template and segmentation 104.

Figure 2:
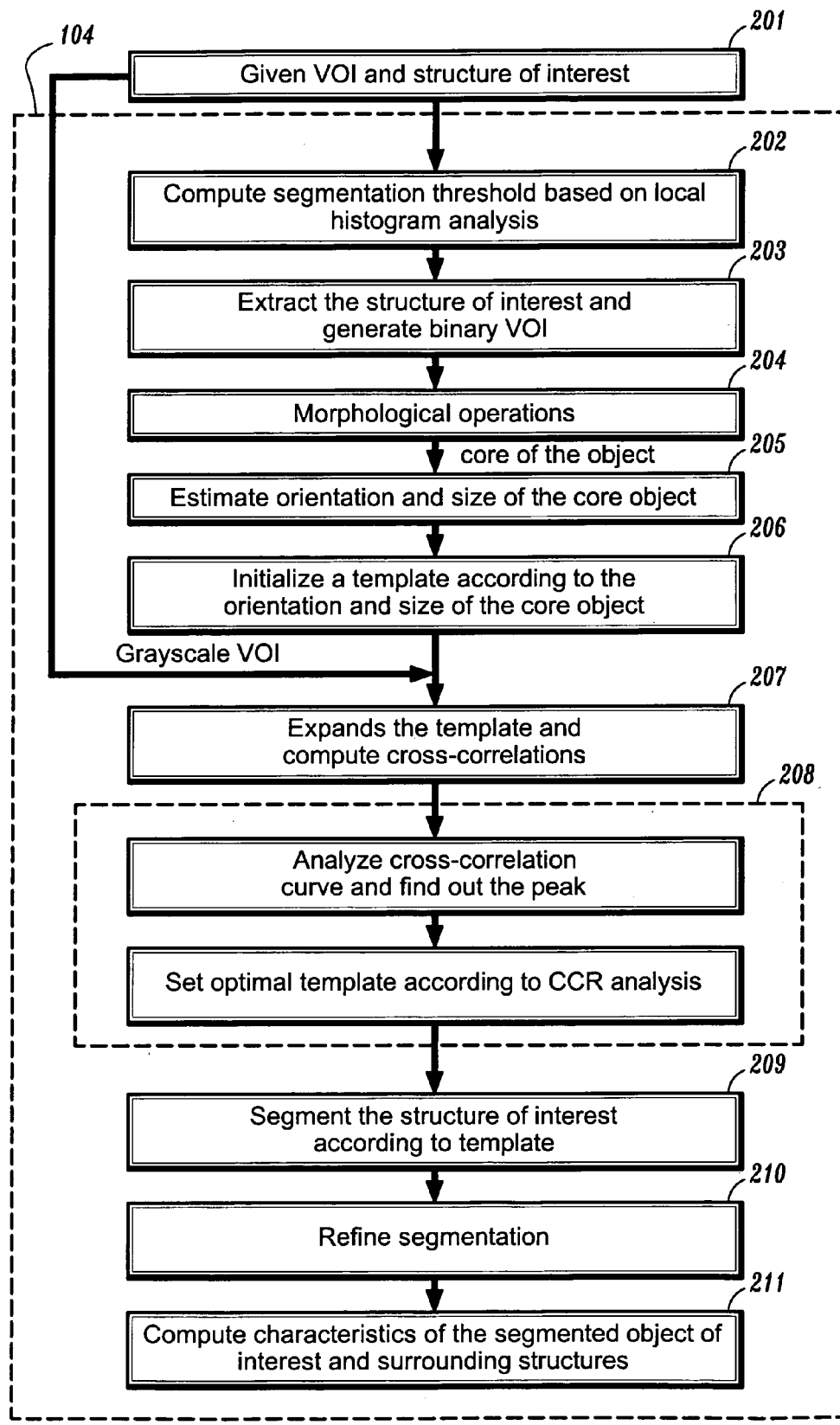
FIG. 2 is a flow chart of a method for initialization of a 3D template and segmentation, according to an embodiment of the present invention.

Referring to FIG. 2, given the VOI and structure of interest 201, the method adaptively chooses an intensity threshold for segmentation based on local histogram analysis 202. The method extracts the structure of interest using the intensity threshold and 3D connectivity information 203, for example 10-, 18- or 26-connectivity. A binary VOI is generated by thresholding. The core of the object of interest is determined using morphological operations 205, such as but not restricted to morphological opening. The term "core" refers to a portion of the object of interest, which could be similar in shape and size to the object of interest if it is an isolated nodule, or is different in shape and size from the whole object of interest if it is a nodule attached to other anatomical structures or if it is a structure other than nodule. According to an embodiment of the present invention, one method of obtaining the core is to use morphological operations, such as opening. The method estimates the orientation and size of the core 205. Orientation could be estimated by computing the eigenvalues and eigenvectors. The 3D template is initialized as an ellipsoid aligned along the orientation of the core 206. The size of the template is smaller than that of the core. The method expands or grows the 3D template and computes its cross correlations to the structure of interest at each expansion step 207. Cross correlations can be computed between gray scale objects, binary objects or between a grayscale object and a binary object. Cross correlation can be defined as:

$$ccr(i, j, k) = \frac{\sum_i \sum_j \sum_k f(x+i, y+j, z+k) g(i, j, k)}{\sqrt{\sum_i \sum_j \sum_k f^2(x+i, y+j, z+k) \sum_i \sum_j \sum_k g^2(i, j, k)}},$$

wherein f represents the structure of interest, and g represents the template. The 3D template grows as the radiuses of the ellipsoid template increase. Cross correlation is determined at each growth step and its corresponding curve is plotted on the screen for assisting the user's decision making. With the 3D template set; the method analyzes the curve of cross correlations and determines a peak value 208. A cutoff value is set empirically. A template is obtained by choosing the parameter settings at the cutoff value. The structure of interest is segmented according to the template 209. This can be done by performing an 'AND' operation between the template and the structure of interest, and we refer to this result as rough-segmentation result. The segmentation is refined 210, the segmentation result obtained form the previous step sometimes could be over-smoothed and loose some surface details which are important indicator for diagnosis, e.g., for classifying the nodule as benign or malignant. Further processing can refine the segmentation so that these details will be kept, described with respect to FIG. 4. Geometric characteristics, such as shape and intensity information, are determined for both the segmented part and the rest of the VOI 211. This information along with surface information could be helpful in nodule diagnosis.

Referring again to FIG. 1, initial segmentation results are displayed 105. Display includes the plot of the cross correlation curve while the template deforms, indicating the cutoff value (FIG. 2, block 209) and suggested template parameters, 3D rendering of the structure of interest, 3D rendering of the computer suggested template, and 3D rendering of the segmentation result. User can rotate the displays randomly in 3D to have intuitive information. The displays of the structure of interest, the 3D template, and the segmentation result can be synchronized when rotating. This facilitates the user's understanding of the result.

A user can make a final decision on the segmentation 106. While studying the segmentation result rendered, the user makes a decision whether the segmentation result is satisfactory. When the segmentation result is satisfactory, the user can exit the interactive segmentation procedure 108. Segmentation result and parameter settings are saved, and could be reloaded later for follow-up study or re-examination. Reproducible and consistent segmentation results can therefore be generated.

If the current segmentation result is not satisfactory, the user can do interactive correction by adjusting the scrolling bars that indicate the parameter settings of the template 107. The method reconstructs the 3D template according to the parameters adjusted by the user. The user can adjust the parameters with locked ratio or can adjust the parameters separately. The method segments the object of interest using to the new template. The method refines the segmentation, and characterizes the segmented object and the rest of the structure. The method then continues to display the adjusted segmentation results.

Figure 3:
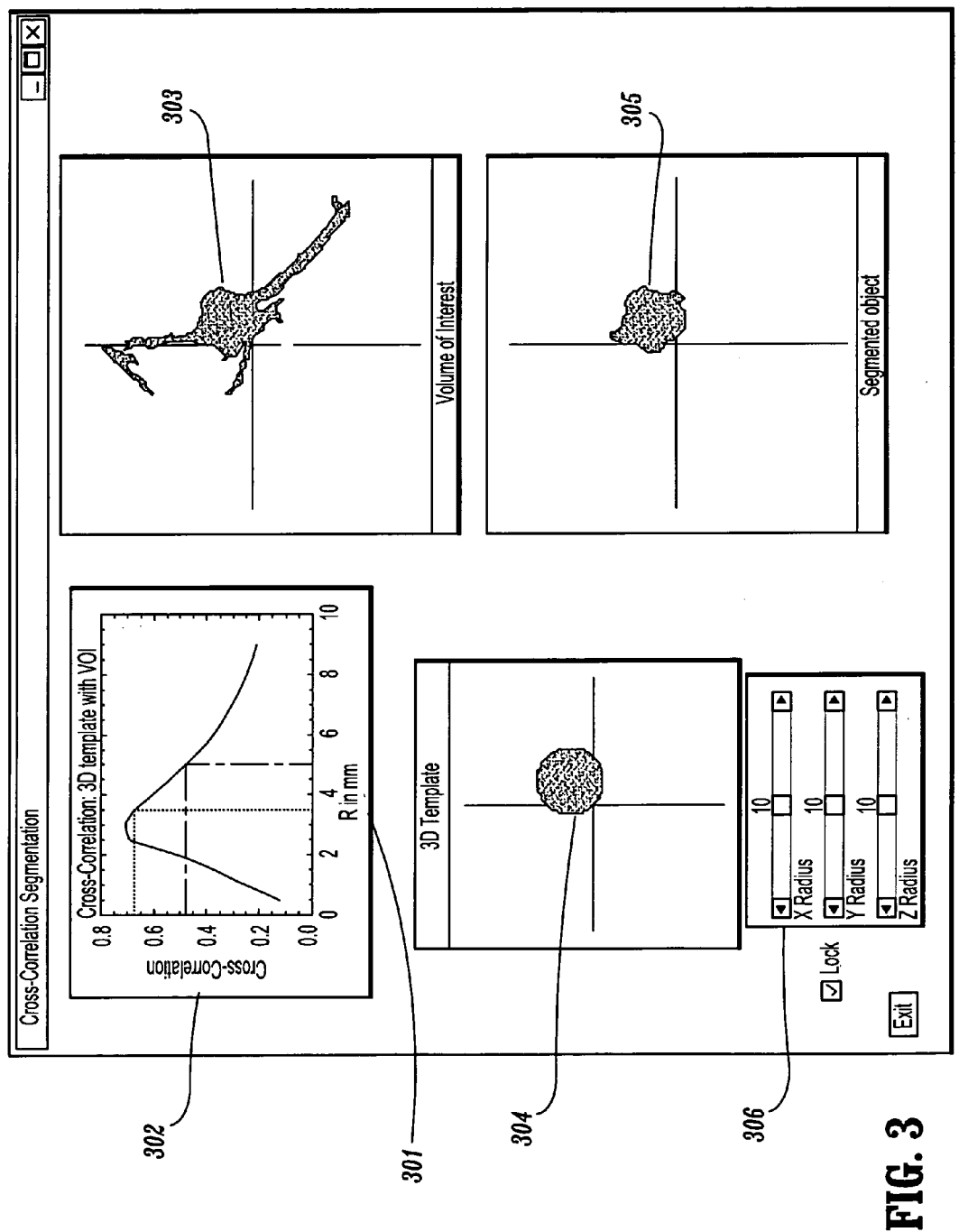
FIG. 3 shows an example of interface for interactive segmentation, according to an embodiment of the present invention.

FIG. 3 shows an example of interface for interactive segmentation. A plot of R (mm) 301 verses cross correlation 302, that is, a 3D template with VOI is displayed. A nodule attached to vessels in the volume of interest 303 is displayed. A 3D template aligned along the orientation of a core 304 of the nodule 303 is displayed. A segmented object, showing a segmentation result 305 for the nodule 303 is displayed. These components can be provided together with a set of controls 306 for controlling, for example, the x axis, y axis and z axis of each 3D component. These controls can be, for example, scroll bars, a hand tool, etc. Further, the interface can provide additional features within the scope of the present invention, for example, locks for a of the scroll bars.

Figure 4:
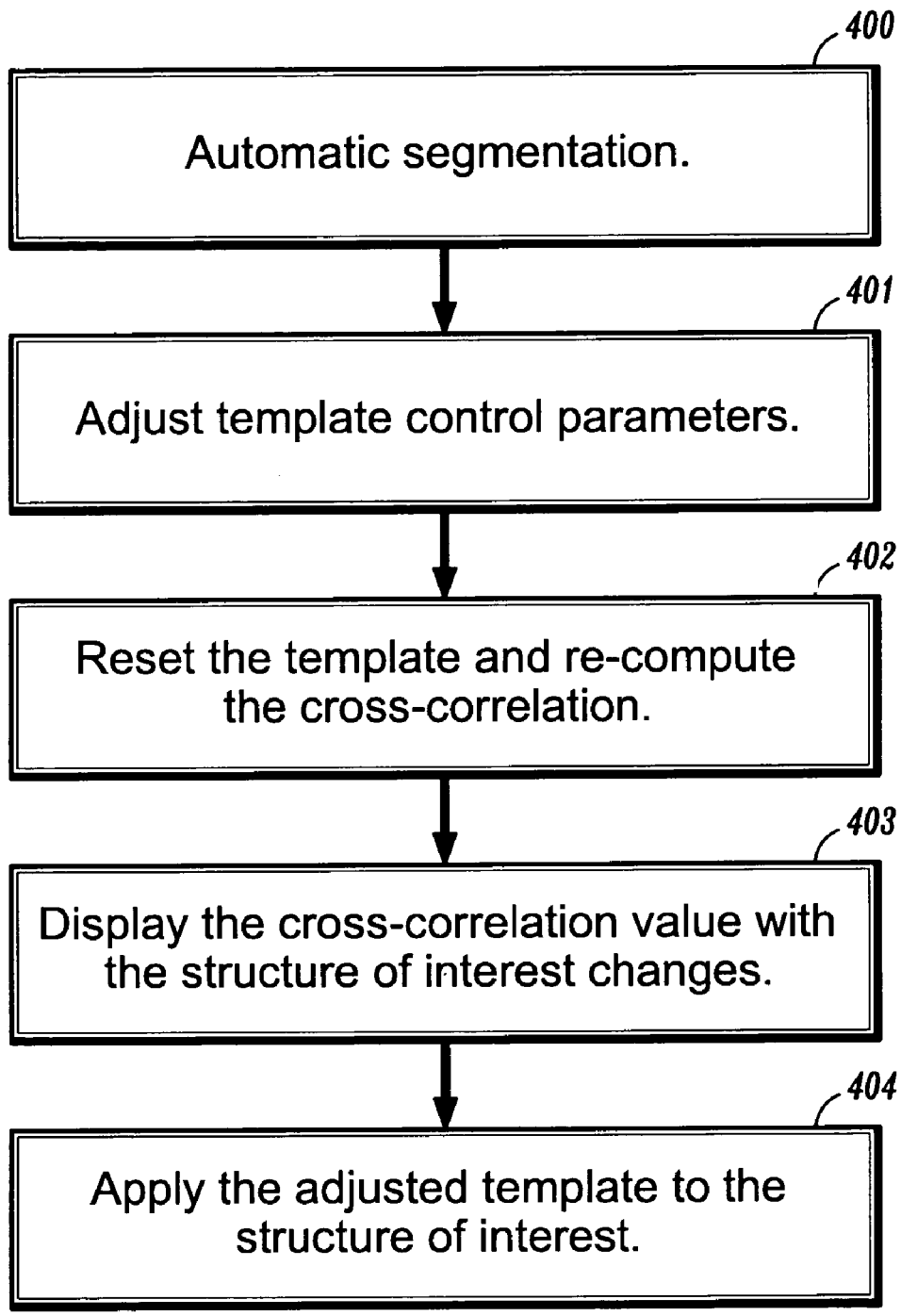
FIG. 4 is a flow chart of a method of using the control parameters to adjust segmentation.

According to FIG. 4, given an automatic segmentation 400, a user can adjust template control parameters 401 using for example, scroll bars or a hand tool. The method resets the template, e.g., 304 FIG. 3, and re-computes the cross correlation 402. The cross correlation is displayed, e.g., 301 and 302 FIG. 3, with the structure of interest changes 403. The adjusted template is applied to the structure of interest 404, and the refined segmentation is shown, e.g., 305 FIG. 3.

Figure 5:
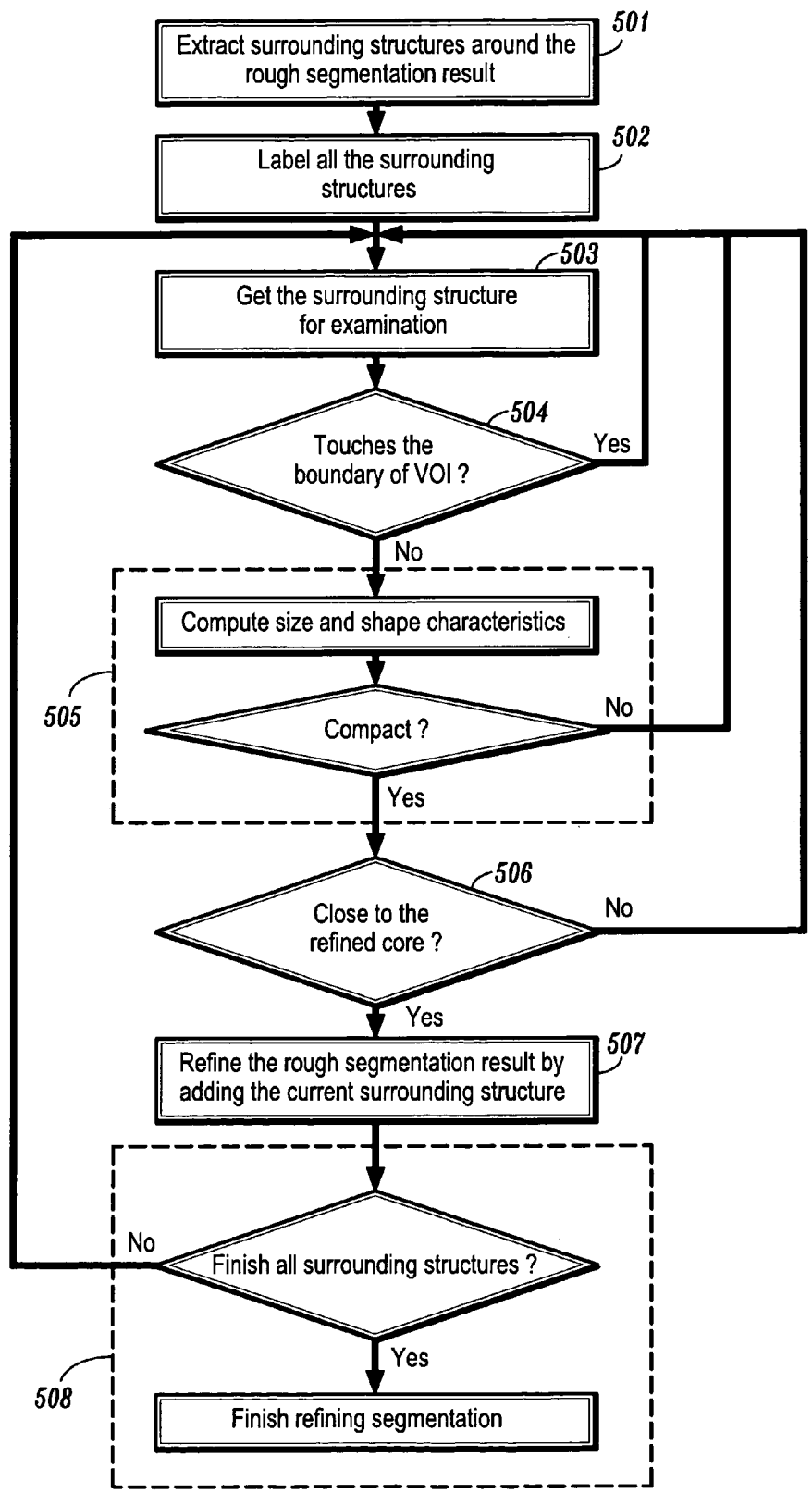
FIG. 5 is a flow chart of a method of modifying segmentation, according to an embodiment of the present invention.

Referring to FIG. 5, the method extracts all the surrounding anatomical structures around the rough segmentation result 501 segmented out in block 209. In cases where nodules are attached to chest wall and/or vessels, the surrounding structures include the attached vessels and chest wall, as well as some parts of the nodule that are not included in the rough segmentation result. The method labels the surrounding structures 502.

For each surrounding structure 503 the method automatically determines whether the surrounding structure touches the boundary of the VOI 504, and if so the current surrounding structure is considered to be an elongated object, and is not part of the refined segmentation result, and the method returns to block 503. Otherwise, the method determines the size and shape characteristics of the current surrounding structure 505. If the structure is determined to be compact, e.g., not linear, and close to the refined core 506 according to a threshold, the method refines the rough segmentation 507. However, if the structure is determined to be linear the method returns to block 503.

The method determines the distance of the current surrounding structure to the rough segmentation result 506. If the distance between the current surrounding structure and the rough segmentation result is large (e.g., as compared to a predefined threshold), the current surrounding structure is considered not a part of the refined segmentation. Upon determining the distance to be small (e.g., as compared to a predefined threshold), the method refines the segmentation result by adding in the current surrounding structure 507. The method determines whether all surrounding structures having been evaluated and if so finishes 508. Otherwise, the method returns to block 503.

Having described embodiments for a method of real time interactive segmentation of pulmonary nodules with control parameters, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claimed and desired protected by Letters Patent is set forth in the appended claims.

What is claimed is:

1. A method for refining a segmentation of an object of interest from a digital volumetric image comprising the steps of:
   providing the segmentation of object of interest;
   determining a core of the object of interest;
   initializing a template based on the core, the template having an adjustable parameter for determining a refined segmentation of the object of interest, wherein the core of the object of interest is a three-dimensional volume within the object of interest and the initialized template has a volume smaller than the volume of the core; and
   adjusting the parameter to add or delete a structure to or from the refined segmentation of the object of interest.

2. The method of claim 1, further comprising the steps of:
   storing a value of the parameter;
   storing a refined segmentation of the object of interest according to the value of the parameter; and
   comparing a stored refined segmentation to a second segmentation of the object of interest determined using the value of the parameter.

3. The method of claim 1, further comprising the step of extracting the object of interest using an intensity threshold and three-dimensional connectivity information.

4. The method of claim 3, further comprising the step of selecting the intensity threshold for segmentation according to a local histogram analysis of the digital volumetric image.

5. The method of claim 1, wherein the core is determined according to morphological operations.

6. The method of claim 1, further comprising the step of determining, recursively, a cross correlation to the structure of interest at a plurality of growth steps.

7. The method of claim 1, further comprising the steps of:
   determining a cross correlation for the object of interest; and
   determining a cutoff value.

8. The method of claim 7, wherein the template is suggested according to the cutoff value.

9. The method of claim 1, further comprising the step of determining an orientation of the object of interest according to an eigenvlues and an eignenvector.

10. The method of claim 1, further comprising the step of adjusting, interactively, the parameter in real time.

* * * * *